United States Patent
Frieden et al.

(10) Patent No.: US 8,694,514 B2
(45) Date of Patent: Apr. 8, 2014

(54) COLLABORATIVE FILTERING ENGINE

(75) Inventors: Kurt Frieden, Berkeley, CA (US); Mitch Rudominer, El Cerrito, CA (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 12/899,406

(22) Filed: Oct. 6, 2010

(65) Prior Publication Data

US 2011/0087678 A1 Apr. 14, 2011

Related U.S. Application Data

(60) Provisional application No. 61/250,841, filed on Oct. 12, 2009.

(51) Int. Cl.
*G06F 17/30* (2006.01)

(52) U.S. Cl.
USPC .......................................... 707/749; 707/754

(58) Field of Classification Search
USPC .................................................. 707/749, 754
See application file for complete search history.

(56) References Cited

U.S. PATENT DOCUMENTS

| | | | |
|---|---|---|---|
| 5,835,087 A | 11/1998 | Herz et al. | |
| 6,285,999 B1 | 9/2001 | Page | |
| 6,629,097 B1 | 9/2003 | Keith | |
| 2005/0071251 A1 | 3/2005 | Linden et al. | |
| 2005/0108001 A1 | 5/2005 | Aarskog | |
| 2005/0240580 A1 | 10/2005 | Zamir et al. | |
| 2006/0200432 A1 | 9/2006 | Flinn et al. | |
| 2008/0052274 A1 | 2/2008 | Moore et al. | |
| 2008/0312992 A1 | 12/2008 | Hoshi et al. | |
| 2009/0132561 A1* | 5/2009 | Cormode et al. | 707/100 |
| 2009/0271232 A1 | 10/2009 | Waguet et al. | |
| 2010/0185579 A1 | 7/2010 | Hong et al. | |
| 2010/0274815 A1 | 10/2010 | Vanasco | |
| 2010/0280882 A1 | 11/2010 | Faith et al. | |
| 2011/0087516 A1 | 4/2011 | Frieden et al. | |
| 2011/0087644 A1 | 4/2011 | Frieden et al. | |

OTHER PUBLICATIONS

Pillai, S, et al., "The Perron-Frobenius Theorem: some of its applications," IEEE Signal Processing Magazine, 2005, vol. 22, Iss. 2, 14 pages.
U.S. Appl. No. 12/899,395, filed Oct. 6, 2010, Office Action mailed Sep. 7, 2012, 18 pages.
U.S. Appl. No. 12/899,427, filed Oct. 6, 2010, Final Office Action mailed Sep. 13, 2012, 16 pages.
Eirinaki, Magdalini P., "New Approaches to Web Personalization," Ph.D. Thesis for Athens University of Economics and Business, Department of Informatics, May 2006, 119 pages.

(Continued)

*Primary Examiner* — Hosain Alam
*Assistant Examiner* — Johnese Johnson
(74) *Attorney, Agent, or Firm* — Kilpatrick Townsend & Stockton LLP (57) ABSTRACT

Various systems and methods for collaborative filtering of enterprise objects are described. A first object and a second object, which may be enterprise objects, may be compared. Vectors associated with each object may be created. These vectors may contain elements that indicate one or more actions performed involving other objects. Using these vectors, a similarity comparison may be performed to determine the amount of similarity between the objects. Based on a similarity value determined from the similarity comparison between the vectors, the second object may be recommended to a user.

20 Claims, 6 Drawing Sheets

(56) References Cited

OTHER PUBLICATIONS

Gulli, Antonino, "On Two Web IR Boosting Tools: Clustering and Ranking," Universita degli Studi di Pisa, Dipartimento di Informatica, Ph.D, Thesis, May 6, 2006, 118 pages.

Kulis, Brian, et al., "Fast Low-Rank Semidefinite Programming for Embedding and Clustering," In Proceedings of the 11th Intl. AISTATS Conference, 2007, 8 pages.

Penev, Alex, "Search in Personal Spaces," A Thesis for Doctor of Philosophy, University of New South Wales School of Computer Science and Engineering, BE Software Eng. (Hons I), UNSW 2005, Aug. 2009, 177 pages.

U.S. Appl. No. 12/899,427, filed Oct. 6, 2010, Office Action mailed May 4, 2012, 16 pages.

U.S. Appl. No. 12/899,395, filed Oct. 6, 2010, Final Office Action mailed Jan. 31, 2013, 21 pages.

U.S. Appl. No. 12/899,395, filed Oct. 6, 2010, Advisory Action mailed Apr. 29, 2013, 5 pages.

U.S. Appl. No. 12/899,427, filed Oct. 6, 2010, Advisory Action mailed Nov. 19, 2012, 3 pages.

\* cited by examiner

COLLABORATIVE FILTERING ENGINE

CROSS-REFERENCES TO RELATED APPLICATIONS

This application is a non-provisional of U.S. Provisional Patent Application No. 61/250,841, filed Oct. 12, 2009 entitled COLLABORATIVE FILTERING ENGINE, the entire disclosure of which is incorporated by reference for all purposes. Further, this application is related to U.S. patent application Ser. No. 12/899,395, filed Oct. 6, 2010, entitled "Methods and Systems for Collecting and Analyzing Enterprise Activities," and U.S. patent application Ser. No. 12/899,427, filed Oct. 6, 2010, entitled "Enterprise Node Rank Engine," the entire disclosures of which are incorporated by reference for all purposes.

BACKGROUND OF THE INVENTION

When a user of an enterprise electronically interacts with an object of the enterprise, which may be another user, a file, an email, a web page, or some other item, it may be beneficial to provide the user with a listing of other objects that the user may want or need to interact with. It may be difficult to provide recommendations to users regarding objects in an enterprise context for several reasons, one may be that few links between such objects exist. Therefore, attempting to identify a object of an enterprise's computer system that may be associated with another object, and worthy of recommendation to a user, may be difficult and unlikely to provide the user with useful recommendations.

BRIEF SUMMARY OF THE INVENTION

In some embodiments, a method for collaborative filtering of enterprise objects is present. The method may include identifying a first object. The method may include identifying a second object to be compared to the first object for similarity, wherein: the first object and the second object are enterprise objects; the first and second objects are either users or items; and the enterprise is a business organization. The method may include creating a first vector, comprising a first plurality of elements, linked to the first object, wherein each of the first plurality of elements is linked to at least one action performed involving the first object. The method may also include creating a second vector, comprising a second plurality of elements, linked to the second object, wherein each of the second plurality of elements is linked to at least one action performed involving the second object. The method may include performing a Tanimoto similarity comparison using the first vector and the second vector to calculate a similarity value that identifies an amount of similarity between actions involving the first object and actions involving the second object. The method may include presenting an indication of the second object to a user, wherein the indication is at least partially based on the similarity value between the first object and the second object.

In some embodiments, the first object is a first user and the second object is a second user. In some embodiments, the first object is a first item and the second object is a second item. In some embodiments, the user has interacted with the first object and the second object is similar to the first object. In some embodiments, the method includes presenting an indication of an item to the user, wherein the item has been interacted with by the second user. In some embodiments, the method includes storing, by the computer system, the similarity value in a database that stores a plurality of similarity values for a plurality of pairs of objects of the enterprise.

In some embodiments, a method for collaborative filtering of enterprise objects may be present. The method may include identifying a first object. The method may include identifying a second object to be compared to the first object, wherein the first object and the second object are part of an enterprise. The method may include creating a first vector linked to the first object, wherein the first vector comprises a first plurality of elements indicating actions performed involving the first object. The method may include creating a second vector linked to the second object, wherein the second vector comprises a second plurality of elements indicating actions performed involving the second object. The method may include performing a similarity comparison using the first vector and the second vector, wherein the similarity comparison calculates a similarity value that identifies an amount of similarity between the first object and the second object of the enterprise based on actions performed involving the first object and the second object.

In some embodiments, a computer program product stored on a computer-readable storage medium for collaborative filtering of enterprise objects may be present. The computer program product may include instructions for identifying a first object. The computer program product may include instructions for identifying a second object to be compared with the first object, wherein the first object and the second object are part of an enterprise. The computer program product may include instructions for creating a first vector linked to the first object, wherein the first vector comprises a first plurality of elements indicating actions performed involving the first object. The computer program product may include instructions for creating a second vector linked to the second object, wherein the second vector comprises a second plurality of element indicating actions performed involving the second object. The computer program product may include instructions for performing a similarity comparison using the first vector and the second vector, wherein the similarity comparison calculates a similarity value that identifies an amount of similarity between the first object and the second object of the enterprise based on actions performed involving the first object and the second object.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Within an enterprise, it may be useful to determine the similarity of objects based on actions performed involving those objects. Using the similarly of objects, which is determined based on the actions performed involving those objects, a recommendation may be made to a user regarding an object that may be of interest to the user. For example, if a user views a first document, it may be likely that the user may be interested in a second document, based upon the fact that other users who have edited the first document have also edited the second document.

In order to determine the similarity between objects based on actions, a similarity score between various pairs of objects within an enterprise may be determined. This similarity score may be determined by examining various actions that have been performed involving the objects. To accomplish this, some, if not all, of the actions performed involving objects within an enterprise may be stored in order to allow for the similarity between various pairs of objects to be calculated.

To be clear, a object may refer to a user or an item. An item includes documents, web pages, emails, wikis, etc. Therefore, determining the similarity between two objects may involve determining the similarity between a first user and a second user, or between a first item and a second item. It may also be possible to determine the similarity between a user and an item, and an item and a user. A node may refer to any object in the context of mathematically modeling the objects to determine the relationships between the objects.

To determine the similarity between a pair of objects within an enterprise's computer system, such as an intranet or corporate local area network, each event involving the objects may be logged and stored. An event may include a first object that performs an action, the action, and a second object that the action is performed on. Periodically (or continuously) the actions involving the objects may be used to determine an amount of similarity between the objects. This amount of similarity may be expressed as a similarity score.

To determine the amount of similarity between two items, a vector may be established for each item. This vector may contain a number of elements that each identify whether and/or how a particular object (such as a user) interacted with the associated item. Two vectors associated with two different items may be compared to determine a similarity score between the two items. This similarity score may then be stored and/or presented to a user. At some future time, if a user interacts with one of the items, the similarity score may be used to determine if the user should be presented with a recommendation that indicates the other item may be of interest to the user.

While the above discusses item-to-item similarity, a user-to-user similarity score may be desired. To determine the amount of similarity between two users, a vector may be created for each user. This vector may contain a series of elements that each identify an action or a series of actions performed by the user involving a particular item. Vectors associated with different users may be compared to determine a similarity score between the two users, based upon the objects each user has interacted with and what actions those users have performed involving the objects. This similarity score may be stored or presented to a user. If the similarity score is low, the users may not be presented with any recommendation regarding the other user. However, if the similarity score is high, one or both of the users may be presented with a recommendation that she is similar to the other user. After a similar user has been determined, items which the similar user has worked with may be recommended to the other user.

Recommendations provided to a user may be either contextual or non-contextual. A contextual recommendation may refer to recommendation described as: users who worked with this item also with these other items (item to item recommendation), or the following users have worked with the same items (user to user recommendation). Such contextual recommendations may be at least in part determined based on a object the user is currently working with. A non-contextual recommendation may be independent of the object the user is currently working with. A non-contextual recommendation may be based on activities the user has performed, such as: recommended items that are most similar to the items the user has interacted with most recently, recommended items that are most similar to the items the user has interacted with most often, and recommended items based on items worked on (either recently and/or most often) by other users similar to the user.

Figure 1:
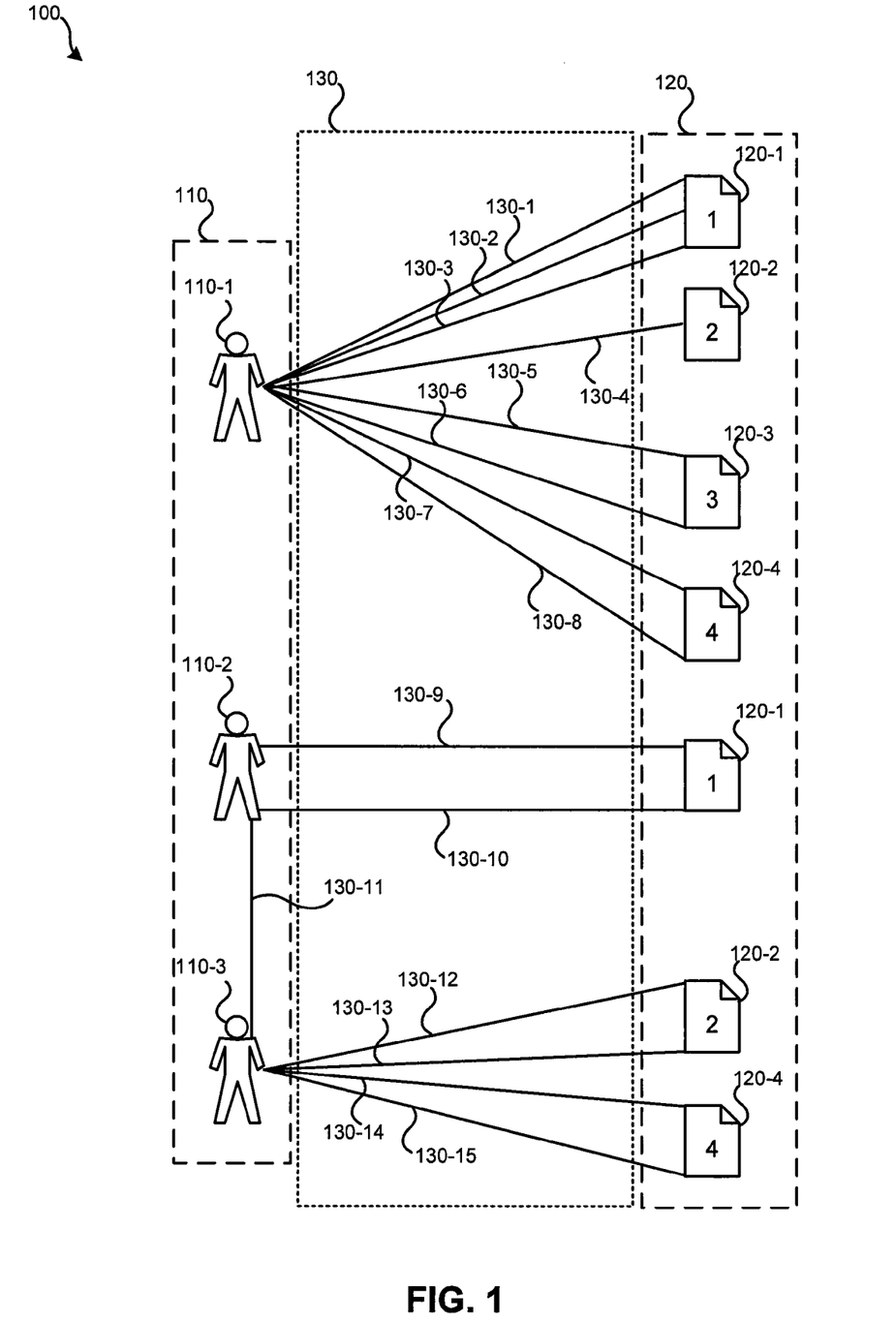
FIG. 1 illustrates a system for organizing and monitoring objects of an enterprise.

FIG. 1 illustrates a system 100 for organizing and maintaining objects of an enterprise. This system may be represented in the form of a data structure diagram. Users 110 may interact with other users of users 110. Users 110 may also interact with items 120. Whether users 110 are interacting with other users of users 110 or an item of items 120, actions 130 may be logged and stored. An event may include two objects and an action: a object performing an action, the action, and the object the action is being performed on. Therefore, each individual user may be involved in a number of events, such as user 110-1 of users 110 may be associated with a number of items (such as items 120-1, 120-2, 120-3, and 120-4) and associated actions (130-1, 130-2, 130-3). Further, the user may be associated with the various actions she performed involving these items. For item 120-1, the user may be associated with actions "Open" 130-1, "Print" 130-2, and "Edit" 130-3. As each event is performed, it may be stored for later reference.

System 100 of FIG. 1 may list some or all of the objects, including the users, within an enterprise, and some or all of the actions and events involving such objects of the system. Therefore, an enterprise's social network, representing some or all of the users within an enterprise may be a subset of all of the objects within system 100.

Users 110 may represent all of the users that have an account with a computer system of an enterprise. System 100 illustrates three users for simplicity only; it should be understood that more (or fewer) users may be part of system 100. Each user (in system 100, user 110-1, user 110-2, and user 110-3) may be associated with one or more items (and/or other users) with which he has interacted. For example, user 110-1 is linked to items 120-1, 120-2, 120-3, and 120-4. Merely by way of example, item 120-1 may represent a document (such as a text document or a spreadsheet), item 120-2 may represent a wiki (or an article within a wiki), item 120-3 may represent a webpage, and item 120-4 may represent an email. As those with skill in the art will recognize, various other items are possible, and the examples of web pages, emails, documents, and wikis are only examples.

For each item that user 110-1 is associated with, the user 110-1 may also be associated with an action that involved user 110-1 and the associated item. Referring to item 120-1, user 110-1 may be associated with three actions that user 110-1 performed (or was otherwise involved in) regarding item 120-1. In this example, user 110-1 is associated with three actions: an open action (130-1), a print action (130-2) and an edit action (130-3). These actions and objects may also be looked at in terms of events. As discussed, an event involves two objects and an action. For example, an event may include user 110-1, item 120-1, and action 130-1. User 110-1, item 120-1 and action 130-2 may represent another event.

User 110-1 may have the same or different actions associated with other items. For example, referring to item 120-2, the user is associated with an upload action 130-4. Actions 130-5 and 130-6 may be associated with user 110-1 and object 120-3. Further, item 120-4 may be associated with user 110-1 and actions 130-7 and 130-8. As another example, user 110-2 is also associated item 120-5. In the illustrated embodiment, user 110-2 is associated with user 110-3.

Referring to user 110-2, besides being associated with item 120-1 (which is illustrated twice for simplicity: once associated with user 110-1 and once associated with user 110-2), user 110-2 may be associated with user 120-3. Because both objects and users are objects, whether an action involves a user and an item, two users, or two items, substantially the same relationship may be stored as an event: a source (the object performing the action), an action, and a target (the object the action is being performed on). Therefore, in one event, user 110-2 may be associated with user 110-3 and action 130-11, which may involve user 110-3 being added as a contact, or some other action.

It should be understood that only a small portion of the actions involving objects may be illustrated in system 100. Besides actions such as open, print, edit, upload, copy, tag, add contact, many other actions may be possible, such as: delete, move, view, save, undelete, attach, delete contact, send email to (a user), receive email from (a user), like, rate, etc.

Figure 2:
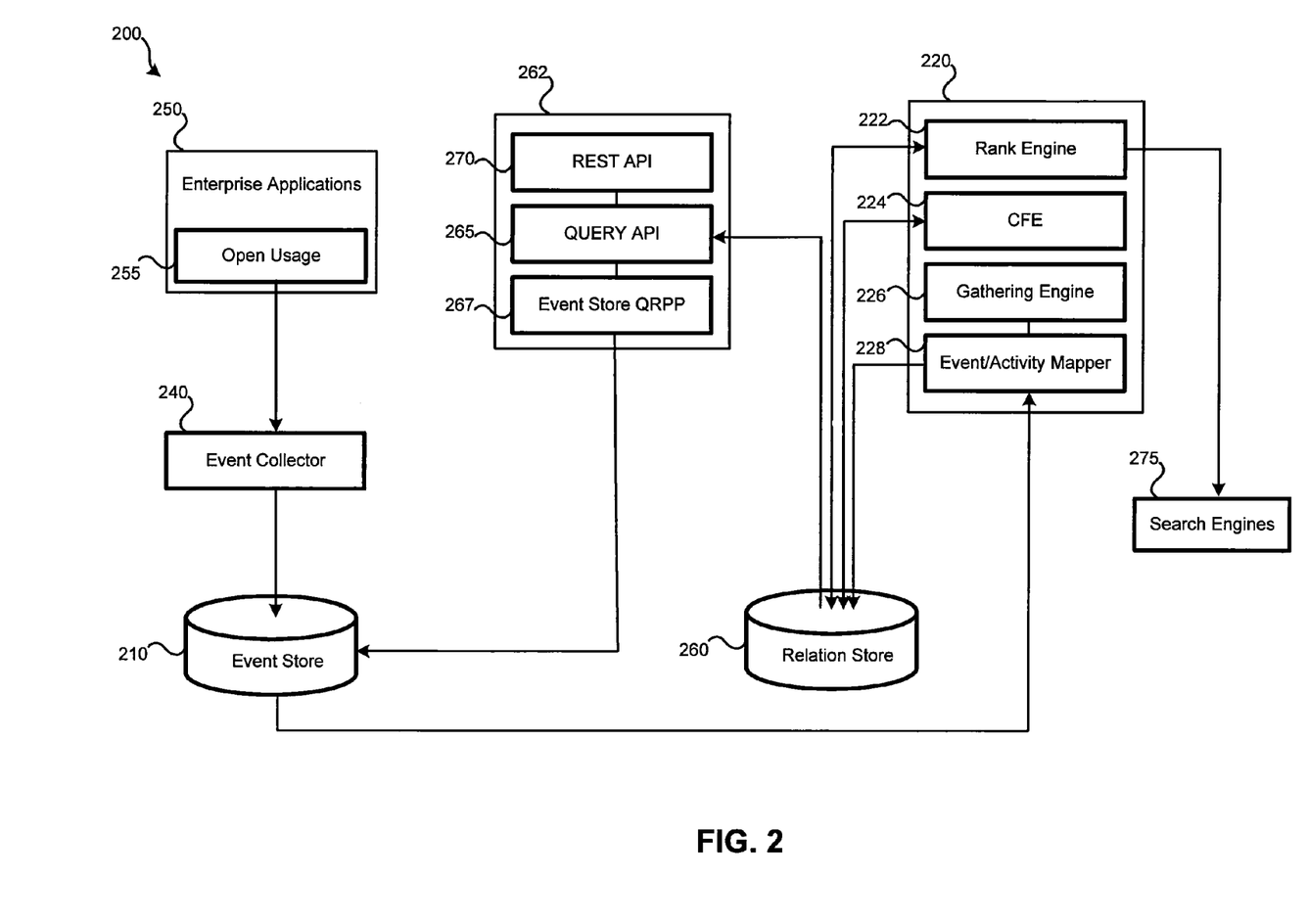
FIG. 2 illustrates a system that may store and analyze various associations between objects of an enterprise.

To maintain system 100, the events involving users 110, items 120, and actions 130 may need to be logged and stored. Further, these events involving users 110, items 120, and actions 130 may be used to determine the similarity between pairs of users, pairs of items, and/or users and items. These functions may be performed by a system that utilizes computer systems and storage devices, such as system 200 of FIG. 2. FIG. 2 illustrates a system 200 that may store and analyze various associations between users, items, and actions.

System 200 may include an event store 210. Event store 210 may store actions that have occurred involving objects in the form of events, using a computer-readable medium, such as memory or one or more hard drives. For example, if a user views a document at some time, event store 210 may store an identifier of the user (e.g., his user name), the time of the action, an identifier of a target item, and the type of action. Therefore, event store 210 may store a chronology (or otherwise organized, such as by source object, target object, or action type) of some or all of the actions performed using the computer system of an enterprise.

Event collector 240 may serve to collect or gather events as they occur (or in a batch processing arrangement that is performed periodically) from various enterprise applications 250, such as Open Usage API 255. Open Usage API 255 may serve to send or gather events for the event store. Event collector 240 may then store these events using event store 210. Event collector 240 and/or Open Usage API 255 may be configured to interact with a variety of different enterprise applications. For example, different steps may need to be performed and/or different files accessed in order to determine what emails a user has interacted with as opposed to what wilds a user has edited an article through.

Event store 210 may be accessed by engines 220. Engines 220 may include a rank engine 222, a Collaborative Filtering Engine (CFE) 224, a gathering engine 226, and an event/activity mapper 228. The gathering engine 226 and event/activity mapper 228 may access and process events stored in event store 210 and store the result of the processed events in relation store 260. Therefore, while event store 210 may contain unorganized or loosely organized events that have involved various objects, gathering engine 226 and event/activity mapper 228 may serve to organize those events and determine the similarity of objects based on those events. Relation store 260 may store various aggregations of events using a computer-readable storage medium, such as memory or one or more hard drives. For example, if there are ten actions in event store 210 indicating a user has opened a document, these may be combined and stored as a single relation between the document and the user that indicates the user has accessed the document ten times in relation store 260. Therefore, the relation store 260 may store data from the event store 210 organized into a format that uses multiple events to determine some or all of the relations.

The CFE 224 may represent an engine that determines the similarity between various objects and users. The results output by the CFE 224, such as the similarity scores determined between various objects, may be stored in relation store 260 or in some other location to be used to recommend to a user some object that is similar to a object the user has interacted with. For example, the CFE 224 may recommend a similar document to a user based on actions that users have performed involving that document. The CFE 224 may also recommend some other user that has performed actions involving the same or similar objects as the user.

Objects may be processed to determine a rank indicating the importance of each object compared to each other objects. Such a ranking may be performed using software, firmware, and/or hardware. The ranking may be performed by rank engine 222 of FIG. 2, or by some other embodiment of a rank engine and may use relations store in a relation store, such as relation store 260. These ranks may be stored in a search index and may be used to help determine an order in which to return search results. For example, the ranks may be used to list objects that have been determined to be important higher in a listing of search results than objects that are deemed to be less important. Various systems and methods for determining similarity are described in detail in U.S. patent application Ser. No. 12/899,427, filed Oct. 6, 2010, entitled "Enterprise Node Rank Engine."

Search engines 275 may be used to interact with engines 220, including rank engine 222 and CFE 224. Therefore, similarity values computed by CFE 224 may be accessed and used by search engines 275.

Query Service 262 may comprise one or more software modules. Query API (Application Programming Interface 265) receives queries for relation data from other applications. A user may submit a search or some other request through Query API 265. The Query API 265 queries the gathered relation data (possibly stored in relation store 260) and provides relation data to the requesting applications. This may also involve the use of rank engine 222 and CFE 224. REST API (Representational State Transfer Application Programming Interface) 270 may be used in conjunction with Query API 265 to interact with and receive information content from a website. The REST API 270 may establish a relationship with various gateways using authentication techniques. REST API 270 may also ensure that JAVASCRIPT hijacking does not occur by ensuring that REST responses are not valid JAVASCRIPT. String parsing may be used to convert text into valid JAVASCRIPT. Event Store QRPP (Query Result Post-Processor) 267 may perform security filtering and metadata provisioning at query time. Therefore, after a preliminary list of results has been determined, the Event Store QRPP 267 may remove objects from the list of the results that a user is not permitted to see. Also, the Event Store QRPP 267 may add information to the list of results that will be presented to the user, such as a name, URL, description, icon IRL, etc. for each object on the list of results that will be presented to the user. Multiple different QRPPs may be present.

Additional detail regarding system 200 and various embodiments of methods utilizing a system, such as system 200 may be found in U.S. patent application Ser. No. 12/899,395, filed Oct. 6, 2010, entitled "Methods and Systems for Collecting and Analyzing Enterprise Activities."

Figure 3:
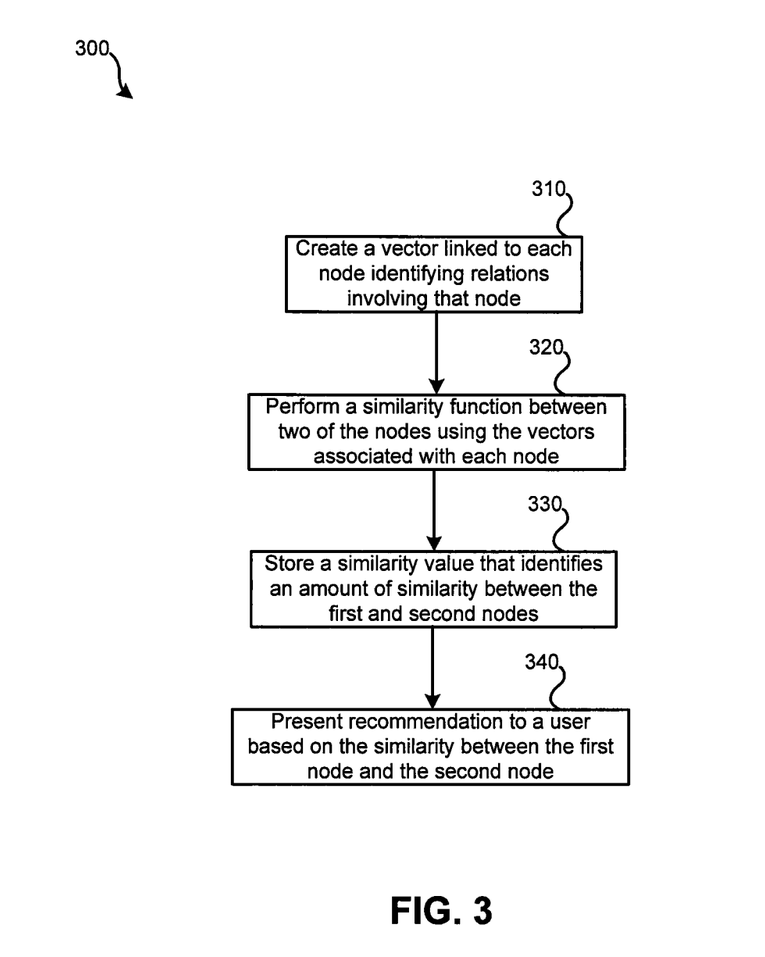
FIG. 3 represents a simplified embodiment of a method for comparing two objects of an enterprise to determine the similarity between the objects based on actions performed involving those objects.

FIG. 3 represents a simplified embodiment of a method for comparing two objects (either two items, two users, or one item and one user) of an enterprise to determine the similarity between the objects based on actions performed involving those objects. Method 300 may be performed by an engine executed by a computer system, such as collaborative filtering engine (CFE) 224 of FIG. 2, or some other CFE.

At block 310, a vector associated with a object may be created. This vector may quantify actions that were performed involving the object. For illustration purposes only, the comparison of two items for similarity will be described here. It should be understood that similar steps may be performed to compare users, or an item with a user. If $p_1$ and $p_2$ represent two items of an enterprise, it may be desired that the amount of similarity between items $p_1$ and $p_2$ be determined. A collection of some or all of the user actions that involved $p_1$ and $p_2$ may be used to determine the similarity between $p_1$ and $p_2$. In some embodiments, these actions may be collected from an event store, such as event store 210 of FIG. 2, relation store 260 of FIG. 2, or some other store of actions or relating performed by users on an enterprise's computer system. The users present in an enterprise may be referred to in accordance with equation one. Therefore, a total number of n users may be present in the set of users of an enterprise:

$$U=\{u_1, u_2, \ldots, u_n)\} \quad \text{Eq. 1}$$

For each of $p_1$ and $p_2$, a vector may be created having n elements. These vectors will be referred to as $v_1$ and $v_2$, wherein $v_1$ is associated with $p_1$, and $v_2$ is associated with $p_2$. An element may be present in the vector for each user present in the set of users of the computer system of the enterprise. The mth element of the vector may be used to store an action performed by the mth user of the enterprise's computer system. The vector may be generically defined as $v_i[k]$, which is the kth element of vector $v_i$, and that the element itself is a number representing a particular action or collection of actions that user $u_k$ has taken on item $p_i$.

As one simplified example, the vector may be used to indicate whether or not each user of the enterprise has edited item $p_1$. To be clear, each element of the vectors may be used to indicate actions other than editing. Also, multiple actions may be indicated by a single value (be it an integer, Boolean, etc., by utilizing relations) as opposed to only actions. Depending on whether the numeric value in the vector is Boolean or an integer, a different similarity function may need to be used to produce a similarity score. Returning to the simplified example, the kth element of the vector associated with $p_1$ may be set to one if the kth user has edited the associated item. Otherwise, the kth element may be set to zero. Therefore, the vector associated with item $p_1$ may represent a vector of (binary) numbers that identify whether users of the enterprise's computer system have edited item $p_1$.

Once vectors have been created for $p_1$ and $p_2$, the vectors may be compared using a similarity function for determining similarity at block 320. It should be noted that in practice hundreds or thousands of vectors may be created for hundreds or thousands objects within an enterprise's computer system. In some instances, even hundreds of thousands or millions of objects may require vectors to be created. A similarity function may be used to determine the amount of similarity between the vectors associated with $p_1$ and $p_2$. A similarity function may calculate a number (a similarity score) that indicates how similar two objects are based on the vectors associated with the objects. One possible similarity function is the Tanimoto similarity function, defined in equation two:

$$\text{sim}(P_1, P_2) = \text{sim}(v_1, v_2) = \frac{\sum_{i=1}^{n} \min(v_1[i], v_2[i])}{\sum_{i=1}^{n} \max(v_1[i], v_2[i])} \quad \text{Eq. 2}$$

Equation two may also be expressed as in equation 3A if $v_1$ and $v_2$ are binary vectors $\{i:v_1[i]=1\}$ and $\{i:v_2[i]=1\}$, respectively:

$$\text{sim}(P_1, P_2) = \frac{|A \cap B|}{|A \cup B|} \quad \text{Eq. 3A}$$

Therefore, A and B would be determined according to equations 3B and 3C:

$$A=\{i:v_1[i]=1\} \quad \text{Eq. 3B}$$

$$B=\{i:v_2[i]=1\} \quad \text{Eq. 3C}$$

Based on the Tanimoto similarity function of equation two, a similarity score may be calculated based on vectors $v_1$ and $v_2$ associated with items $p_1$ and $p_2$, respectively. Equation two may determine the number of elements for which both $v_1$ and $v_2$ reflect a one (here, indicating that the same user has edited both items). This number may then be divided by the number of elements in which at least one of $v_1$ and $v_2$ reflect a one. This result may be referred to as the similarity score. As a simple example, assume there are only five users on an enterprise's computer system. Assume that users 1, 3 and 4 have edited $p_1$. Assume that users 3, 4, and 5 have edited $p_2$. Therefore, $v_1$ may be $\{1, 0, 1, 1, 0\}$, reflecting that users 1, 3 and 4, have edited $p_1$, but not users 2 and 5. For, $v_2$, the vector may be $\{0, 0, 1, 1, 1\}$. Because items three and four of vectors $v_1$ and $v_2$ are the same, the top half of the Tanimoto equation would yield a result of two. Because, in total, at least one of items 1, 3, 4, and 5 of $v_1$ and $v_2$ show that their associated item has been edited, the bottom half of the Tanimoto equation would yield a result of four. Therefore, the similarity scope in this simple example would be 0.5 (2 divided by 4).

At block 330, this similarity score may be stored, possibly in a store such as relation store 260 of FIG. 2, or using some other storage device of a computer system. At block 340, this similarity score may be used to present a recommendation to a user based on the similarity between nodes $p_1$ and $p_2$. For example, if the similarity function (such as the Tanimoto similarity function) resulted in a high similarity value (as compared to similarity values of other pairs of nodes) $p_1$ or $p_2$ may be presented to the user as a recommendation. This may occur if a user has recently interacted with $p_1$. If $p_2$ has the highest or one of the highest similarity scores with $p_1$, the user may be presented with $p_2$ or an indication of $p_2$. Alternatively, if some other node or nodes have higher similarity scores with $p_1$, $p_2$ may not be presented to the user, and instead the node with the higher similarity value may be presented. Also, it should be noted, that because a similarity score has been calculated, it may only be stored for possible future use, each similarity score is not necessarily used to provide a recommendation to a user.

The similarity scores determined at block 320 may be used to recommend an item to a user. For example, if a user is viewing $p_1$, a recommendation may be made to the user to view item $p_2$, if $p_2$ has the highest (or one of the highest) similarity scores to $p_1$. This may be referred to as item-based collaborative filtering. Besides recommending an item based on what the user is currently viewing, recommended items may be determined based on items that the user has interacted with most recently and/or most often. In some embodiments, the recommended items may be selected from a list of items the user has not previously interacted with.

While the above discusses the calculation of a similarity value when the two objects compared are items, a similarity comparison may also be performed when the objects compared are users. This may be performed similarly to when the objects are items. However, while in an item-to-item comparison each element of the vectors associated with the items represents an action (or actions, such as in the form of relating) performed involving a user, in a user-to-user context each element of the vector associated with the user may represent an action (or actions or relations) involving a particular item. Therefore $v_i[k]$ generically represents an element of the vector associated with user i that involves item k. Therefore, the vector associated with user i may have one elements for each item present on the enterprise's computer system or at least in a class of nodes being analyzed. In some embodiments, certain nodes may be ignored, thereby possibly decreasing the number of elements in each vector.

The value of the kth element of $v_i$ may vary according to whether a user has in any (or a particular) way interacted with item k. For example, the kth element may be 0 if the user has not performed any action involving the kth item (over a certain period of time or ever) and may be one if the user has performed an action involving the kth item. Alternatively, the elements may be based on whether multiple actions have been performed involving the kth item. Such user-to-user similarity may be used to recommend to a user another user that has performed actions with at least some of the same items. For example, if a user is viewing $p_1$, a recommendation may be made to the user to view item $p_2$, if $p_2$ has been worked with (either recently or most often) by other users similar to the user. This may be referred to as user-based collaborative filtering.

Figure 4:
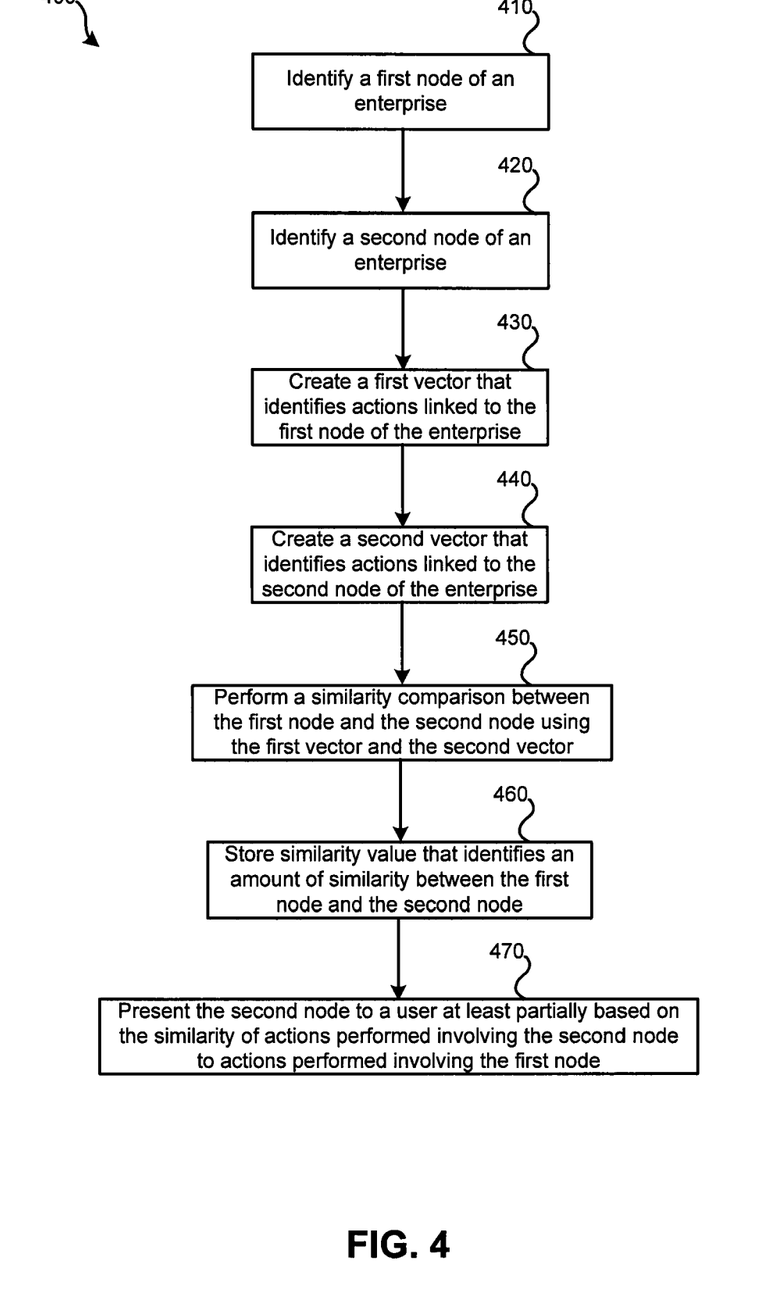
FIG. 4 represents another simplified embodiment of a method for comparing two objects of an enterprise to determine the similarity between the objects based on actions performed involving those objects.

FIG. 4 represents a simplified embodiment of a method for comparing two objects of an enterprise to determine the similarity between the objects based on actions performed involving those objects. It should be understood that as implemented on within an enterprise, such comparisons may be performed thousands or even millions of times to determine the similarity for a large number of objects. Method 400 may be performed by an engine executed by a computer system, such as collaborative filtering engine (CFE) 224 of FIG. 2, or some other CFE. Further, method 400 may represent the same method as method 300, or may represent some other method.

At block 410, a first node (referred to here as $p_1$) of an enterprise may be identified. At block 420, a second node (referred to here as $p_2$) of the enterprise may be identified. It may be desired that the second node be compared to the first node for similarity. The similarity may be determined based on actions that were performed involving both the first node and the second node.

At block 430, a vector ($v_1$) may be created for the first node. If nodes $p_1$ and $p_2$ are items, the vector created may be of length n, which may represent the number of users of the enterprise's computer system or the number of users in a class of users being analyzed. Therefore, an element may be present in the vector for each user present in the set of users (or the class being analyzed) of the computer system of the enterprise. The vector may be defined as $v_1[k]$, which is a numeric representation of the actions that user $u_k$ has taken on item $p_1$. As one simple example, the kth element of the vector associated with an item may be one if the kth user edited the associated item. Otherwise, the kth element may be zero. Therefore, the vector associated with an item may represent a vector of numbers that identifies whether user of the enterprise's computer system has edited the associated item.

At block 440, a vector, $v_2$, be created for $p_2$ following a similar process as performed for $p_1$ at block 430.

At block 450, a similarity comparison may be performed between $p_1$ and $p_2$ using a similarity function. As previously detailed in relation to equation two, one possible similarity function that may be used is the Tanimoto similarity function. The calculation of the similarity function may proceed as discussed in method 300.

At block 460, the similarity value may be stored. At block 470, the similarity value may be used to recommend to a user (who may be interacting with the first object) the second object or an indication of the second object at least partially based on the similarity of the actions performed involving the first object and the second object by other users. Again, it should be noted, that because a similarity score has been calculated, it may only be stored for possible future use, each similarity score is not necessarily used to provide a recommendation to a user. If the second object is a user, in addition or in place of recommending this second user to the first user, items that the second user has recently and/or most often worked with (e.g., edited, opened, liked, commented on, etc.) may be recommended to the first user.

At block 450 of FIG. 4, the similarity comparison may involve a Tanimoto similarity function being used. A Tanimoto similarity function may typically involve only the use of binary input vectors. Accordingly, Tanimoto may allow for only one of two states, such as one or zero, in each element of a vector to be compared to another vector. As such, one state may represent that a user has interacted with an object, while the other may represent that the user has not interacted with the object. A "generalized" form of Tanimoto may also be used. A generalized Tanimoto similarity function may also be represented by equation two, but may be defined for all non-negative vectors. Therefore, a generalized Tanimoto may allow for how many times (as opposed to only if) a user has interacted with an object to be used.

Another possible similarity function that may be used may be the cosine similarity function. This function may be defined in accordance with equation four:

$$\text{sim}(v, w) = \frac{v \cdot w}{\|v\| \cdot \|w\|} \quad \text{Eq. 4}$$

In equation four, $\|w\|$ and $\|v\|$ represents the Euclidean norm of w and v defined by equation five (presented for w), and $v \cdot w$ represents the dot product of v and w defined by equation six:

$$\|w\| = \sqrt{\sum_{i=1}^{n} (w[i])^2}$$ Eq. 5

$$v \cdot w = \sum_{i=1}^{n} v[i]w[i]$$ Eq. 6

Another possible similarity function that may be used involves the Pearson Correlation Coefficient. The correlation coefficient is defined on all input vectors v, and w, by equations seven, eight, and nine, wherein E refers to expected value and coy refers to covariance, as generally understood by those with skill in the art:

$$\rho(v, w) = \frac{\text{cov}(v, w)}{\sigma(v) \cdot \sigma(w)}$$ Eq. 7

$$\text{cov}(v, w) =$$ Eq. 8

$$E(vw) - E(v)E(w) = \frac{1}{n}\left(\sum_{i=1}^{n} v[i] \cdot w[i]\right) - \frac{1}{n}\left(\sum_{i=1}^{n} v[i]\right)\frac{1}{n}\left(\sum_{i=1}^{n} w[i]\right)$$

$$\sigma(v) = \sqrt{E(v^2) - E(w^2)} = \sqrt{\frac{1}{n}\sum_{i=1}^{n}(v[i])^2 - \left(\frac{1}{n}\sum_{i=1}^{n}(v[i])\right)^2}$$ Eq. 9

Figure 5:
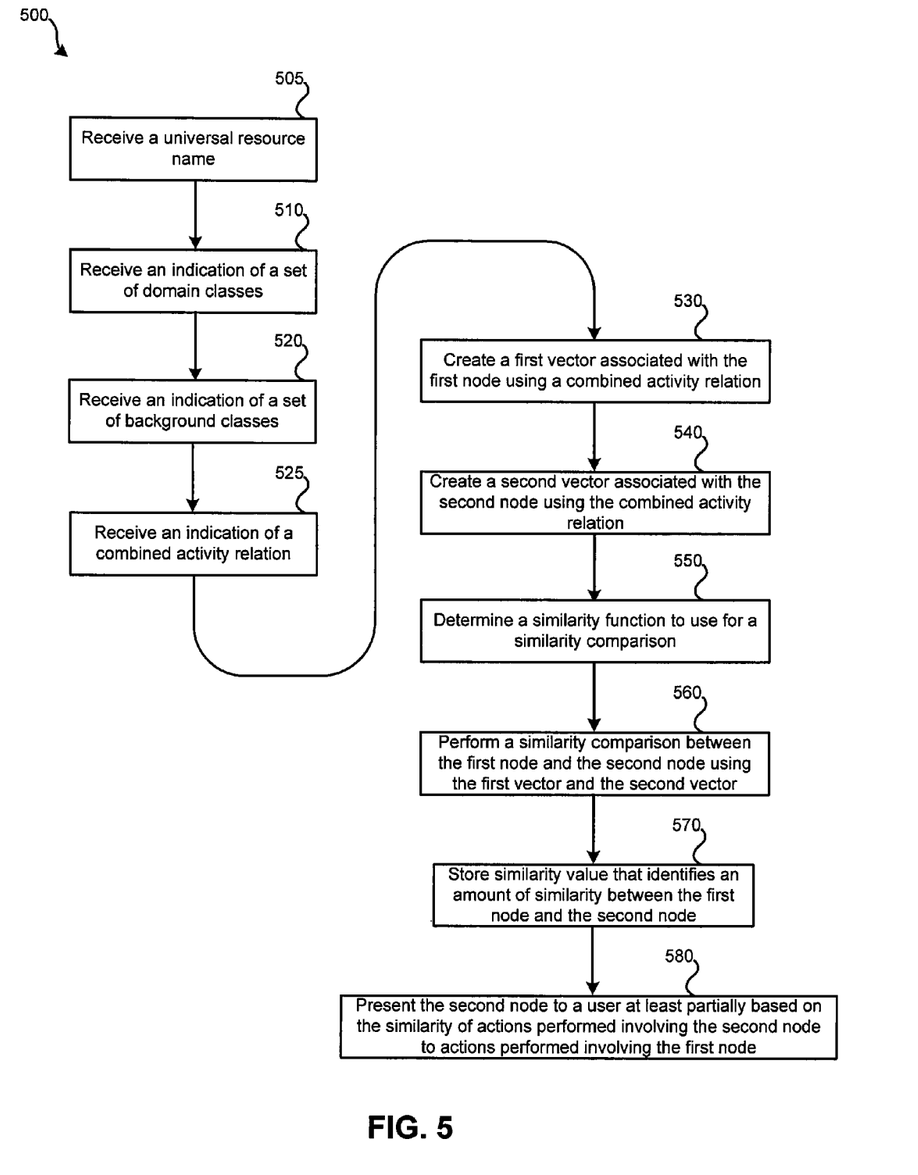
FIG. 5 illustrates a simplified embodiment of a method for comparing two objects of an enterprise to determine the similarity between the objects based on actions performed involving those objects.

In order to calculate item-to-item similarity scores and user-to-user similarity scores, there may exist a number of parameters that need to be configured to arrive at a useful similarity score. At least some of these additional parameters are illustrated in FIG. 5. FIG. 5 illustrates a simplified embodiment of a method 500 for comparing two objects of an enterprise to determine the similarity between the objects based on actions performed involving those objects. Method 500 may represent the same method as method 300 or method 400. Alternatively, method 500 may represent some other method. Method 500 may be performed using a system such as system 200 of FIG. 2, or some other system that includes computer systems. More specifically, method 500 may be performed by CFE 224 of FIG. 2, or some other CFE.

At block 505, a similarity universal resource name (URN) may be received and stored by a computer system of an enterprise. The URN may be specified by a user and may refer to a unique name assigned by the user, who may be a system administrator. The similarity URN (Universal Resource Name) may be used to identify and refer to the similarity comparison. It should be understood that various different similarity comparisons may be stored and implemented based on what similarity comparison is desired to be performed by the system administrator.

Second, at block 510, a set of domain classes may be identified by a user (e.g., a system administrator). The one or more domain classes may refer to classes of nodes for which similarity scores are desired. The set of domain classes may contain one or more domain classes. Domain classes may contain background classes unless an inverse method is used where the sources are the domain objects and the targets are the background objects. In such an inverse arrangement, a domain class may contain target objects. More generically, the term class may be used to refer to a registered item class or user class. As such, if C represents the set of domain classes, then a similarity score sim(a,b) may be calculated for each unordered pair of objects {a,b} such that a!=b and such that the class of a and the class of b are both in C. C, it should be noted, may contain both user and item classes; however, if C contains only item classes, item-to-item similarities will be computed; if C contains only user classes, user-to-user similarities will be computed.

Third, at block 520, a set of background classes may be identified by a user. The set of background classes may contain one or more background classes. Background classes may contain classes that contain background objects. Background objects may contain source objects, that is, objects which performed actions on the target objects. Therefore, if D is the set of background classes, then the set of background objects B is the set of all nodes whose class is in D. If a set of background objects is defined as $B = \{b_1, b_2, \ldots, b_n\}$, then each domain object P is modeled as a vector v of length n in which the kth component of v is a relation value between P and $b_k$.

At block 525, a relation may be defined. To be clear, a relation may be related to one or more actions, but they are not equivalent. An action occurs once and does not change: for example, user "ksmith" opens file "file123" at 3:23 AM. A relation, however, may change with time: for example, user "ksmith" has opened file "file123" 27 times. As another example, a relation would be user 1 is linked to user 2; the action would be setting the link between users 1 and 2.

There may be multiple different types of relations, such as a "sum relation" and a "last-assigned" relation. A sum relation may refer to a relation that accumulates a sum which is added to each time an action occurs. For example, if a relation specifies that "user123" has opened a file 26 times. The sum relation may have one added to it the next time "user123" opens the same file, thus making the sum relation equal to 27. A last-assigned relation may refer to a relation that takes the most recent value of an associated action, either true or false. For example, if "user123" adds a object as a favorite, this may be a last-assigned relation (e.g., either a favorite (true) or not a favorite (false)).

Further, a relation may be simple, Boolean, a non-negative integer, or an integer. It may be possible to consider all of these as integers. For example, the integer value of a Boolean activity may vary depending on whether it is a sum relation or a last-assigned relation. If it is a sum relation, the integer value may be one if true, negative one if false. If the relation is a last-assigned relation, the integer value may be one if true, zero if false.

Also, a relation may decay. This may refer to the integer value of the relation decreasing over time. Such an arrangement may allow recent actions to carry a greater weight than actions that occurred further in the past. Therefore, when a relation is calculated, it may be multiplied by a decay factor for each decay period (e.g., a day, a week) that has passed since the action occurred.

In order to calculate similarity scores a relation may be used to create the vectors associated with objects: R: B×D→ (R). Here, B represents the set of background objects, D represents the set of domain objects, and R represents the set of real numbers. A function may then be used to take a background object and a domain object and assign a number. This number may then be stored in a vector that is associated with the domain object, as described previously, for comparison to other vectors. Therefore, the elements of the vectors may represent a relationship between two objects, wherein each element of the vector is a numeric value (possibly an integer or Boolean value) representing relations involving another object. Relations may be determined based on events. Such relations may have been created by some other piece of software, such as ACTIVITY GRAPH produced by ORACLE.

A combined relation specified by the user at block 525 may take many different forms. A combined relation may represent a single number derived from multiple relations. For example, a combined relation may be determined based on several different types of actions, rather than just one type. To combine relations, several different methods may be used. Three of these methods may include a "Binary Or" method, a "Weighted Sum" method, and an "Inverse" method.

Referring first to the "Binary Or" method, the relation defined may be binary, meaning that R(a,b) may only be one of two states: true or false. Given a list of relations ($R_1, R_2, \ldots, R_n$), the binary OR combination may be defined to be the relation according to equation ten:

$$R(a,b) = R^*_1(a,b) \text{ or } R^*_2(a,b) \text{ or } \ldots R^*_n(a,b) \qquad \text{Eq. 10}$$

In equation ten, $R^*_k$ represents the binary relation induced from $R_k$. If R is Boolean, then $R_k$ is defined such that $R^*_k=1$ if, and only if, $R_k(a,b)=$true. If $R_k$ is an integer, then $R^*_k=1$ if, and only if, $R_k(a,b)>0$. Further, if $R_k$ is a decayed occurrence count, then $R_k(a,b)$ consists of three integers x, y, and z, $R^*_k=1$ if, and only if, $(x+y+z)>0$. For illustration purposes only, consider the following example. There are three relations that are desired to be used to determine the similarity of objects: 1) the number of times a user (the background object, represented by U) has viewed a document (the domain object, represented by P); 2) the number of times the user has edited the document; and 3) whether the document has been marked a "favorite" by the user. Following equation ten, R(U,P)=1 if either 1) the number of the times the document has been read is positive; 2) the number of times the document has been edited is positive; or 3) the document is marked a favorite.

Referring next to the weighted sum method, the combined relation R may be an integer. Given a list of relations and a list of positive integer weights (represented by $\alpha$), the weighted sum combination is defined according to equation eleven:

$$R(a,b) = \alpha_1 R^*_1(a,b) + \alpha_2 R^*_2(a,b) + \ldots \alpha_1 R^*_1(a,b) \qquad \text{Eq. 11}$$

In equation eleven, $R^*_k$ represents the integer relation induced from $R_k$. If $R_k$ is of integer type, then $R_k=R^*_k$. If $R_k$ is of decayed occurrence count type, then $R_k(a,b)$ consists of three integers (x, y, z) and we define $R^*_k(a,b)=x+y+z$. If $R_k$ is of Boolean type, then we define $R^*_k=1$ if $R_k(a,b)$ is true and $R^*_k=0$ if $R_k(a,b)$ is false. The variable a may be used to assign various weights to relations associated with various actions. Therefore, a relation of "edit" may be weighted 0.5, while a relation of "view" may only be weighted 0.2. Therefore, using the weighted sum method may allow for relations that appear to indicate greater interest in a object to be weighted heavier than other relations, thus possibly allowing for more accurate similarity scores.

Referring to the inverse method, given a relation R, the inverse relation may be defined according to equation twelve:

$$-R \text{ by } -R(a,b) = R(b,a) \qquad \text{Eq. 11}$$

The input to this relation may be an ordered pair whose first element is a background object and whose second element is a domain object. Therefore, the source may be the background object and the target is the domain object. By using an inverse method, such as equation eleven, it may be possible to switch the sources to the domain objects and the targets to the background objects.

Whether the "Binary Or" method, the "Weighted Sum" method, or the "Inverse" method is used, at block 530, a first vector may be created using the combined relations for the domain object actions with background objects. Using the same combined relation as used at block 530 to create the first vector, a second vector may be created for another domain object and the set of background objects at block 540.

At block 550, a similarity function, such as those previously discussed, may be selected by a user and used to determine the similarity between various objects by comparing their associated vectors. The similarity function may be a Tanimoto similarity function, a generalized Tanimoto similarity function, cosine or the Pearson Correlation Coefficient. Further, other similarity functions may be possible. At block 560, a similarity comparison may be performed using the vectors created at block 530 and 540 using the similarity function identified at block 550.

At block 570, the similarity value calculated at block 560 may be stored. The similarity value may be stored in a table and/or a database, such as relation store 260 of FIG. 2, or some other computer-readable storage device. At block 580, the similarity value stored at block 570 may be used to provide a recommendation to a user of a object. For example, if the user is interacting with the domain object associated with the first vector, if the second vector has the highest (or one of the highest) similarity values as compared with similarity values for other vectors compared to the first vector, the second object may be recommended to the user. This may involve the user being presented with the second object or an indication of the second object (such as a hyperlink to the second object). Also, it should be noted, that because a similarity score has been calculated, it may only be stored for possible future use, each similarity score is not necessarily used to provide a recommendation to a user.

It should be understood that a method, such as method 500, may be performed intermittently or periodically to update the similarity between objects. For example, once per day such a method may be performed for some set of objects. Therefore, a user may be presented with updated recommendations once per day. Of course, alternatively, such a method may be run more often or less often. If such a method is being performed for an entire enterprise, possibly having thousands or possibly millions of objects, it may be more efficient for such a method to be performed in a batch processing mode. Alternatively, the process may be updated constantly by updating recommendations as relations of a object change.

Figure 6:
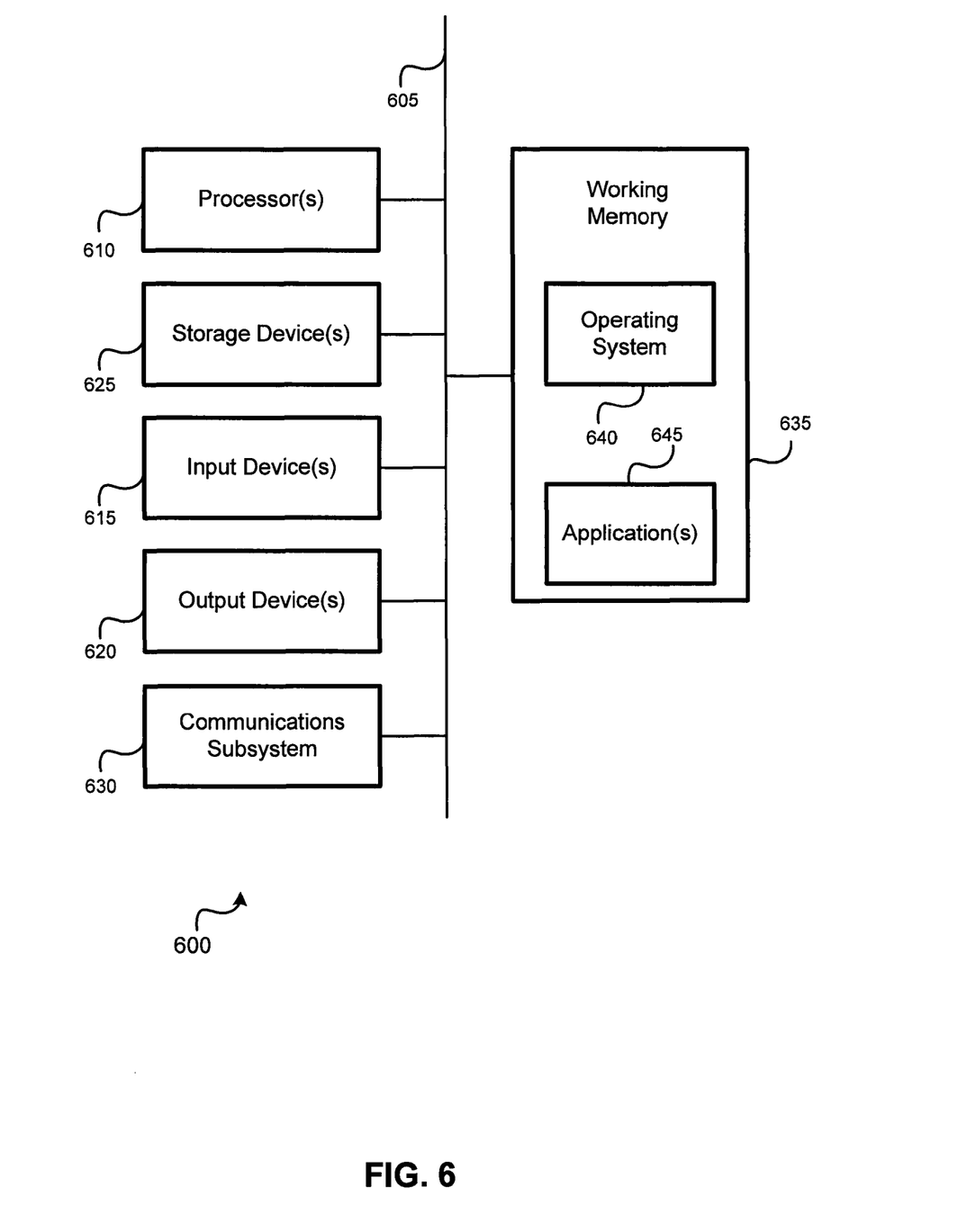
FIG. 6 illustrates a simplified embodiment of a computer system.

To perform the previously described methods, a computer system may be used. Such a computer system may be part of system 200 of FIG. 2. Alternatively, a different system involving a computer system may be used to perform the methods and processes described herein. FIG. 6 provides a schematic illustration of one embodiment of a computer system 600. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, while the above description is in the context of recommending objects within the context of an enterprise, it should be understood that similar arrangements may utilize actions to make recommendations outside of a single enterprise or business organization.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for collaborative filtering of enterprise objects, the method comprising:
   identifying, by a computer system, a first object;
   identifying, by the computer system, a second object to be compared to the first object for similarity, wherein:
      the first object and the second object are enterprise objects;
      the first and second objects are either users or items; and
      the enterprise is a business organization;
   creating, by the computer system, a first vector, comprising a first plurality of elements, linked to the first object, wherein each of the first plurality of elements represents at least one user action performed involving the first object by a first set of one or more users;
   creating, by the computer system, a second vector, comprising a second plurality of elements, linked to the second object, wherein each of the second plurality of elements represents at least one user action performed involving the second object by a second set of one or more users;
   performing, by the computer system, a similarity comparison using the first vector and the second vector to calculate a similarity value that identifies an amount of similarity between user actions involving the first object and user actions involving the second object, wherein the similarity comparison is based at least in part on one or more manners of user interaction corresponding to one or more of: accessing, handling, qualifying, and/or associating with additional information; and
   presenting, by the computer system, an indication of the second object to a user, wherein the indication is at least partially based on the similarity value between the first object and the second object.

2. The method of claim 1, wherein the first object is a first user and the second object is a second user.

3. The method of claim 1, wherein the first object is a first item and the second object is a second item.

4. The method of claim 1, wherein the user has interacted with the first object and the second object is similar to the first object.

5. The method of claim 2, further comprising presenting, by the computer system, an indication of an item to the user, wherein the item has been interacted with by the second user.

6. The method of claim 1, further comprising storing, by the computer system, the similarity value in a database that stores a plurality of similarity values for a plurality of pairs of objects of the enterprise.

7. A method for collaborative filtering of enterprise objects, the method comprising:
   identifying, by a computer system, a first object;
   identifying, by the computer system, a second object to be compared to the first object, wherein the first object and the second object are part of an enterprise;
   creating, by the computer system, a first vector linked to the first object, wherein the first vector comprises a first plurality of elements representing user actions performed involving the first object by a first set of one or more users;
   creating, by the computer system, a second vector linked to the second object, wherein the second vector comprises a second plurality of elements representing user actions performed involving the second object by a second set of one or more users;
   performing, by the computer system, a similarity comparison using the first vector and the second vector, wherein the similarity comparison calculates a similarity value that identifies an amount of similarity between the first object and the second object of the enterprise based on user actions performed involving the first object and the second object, wherein the similarity comparison is based at least in part on one or more manners of user interaction corresponding to one or more of: accessing, handling, qualifying, and/or associating with additional information.

8. The method of claim 7, wherein the first object is a first user and the second object is a second user.

9. The method of claim 7, wherein the first object is a first item and the second object is a second item.

10. The method of claim 7, wherein the similarity comparison comprises using a Tanimoto similarity function and the first vector and second vector are binary vectors.

11. The method of claim 10, wherein the Tanimoto similarity function is a generalized Tanimoto similarity function and the first vector and second vector are non-negative vectors.

12. The method of claim 9, wherein:
the first vector comprises a first element of the first plurality of elements that identifies whether a first user has liked the first item; and
the second vector comprises a second element of the second plurality of elements that identifies whether the first user has liked the second item.

13. The method of claim 7, further comprising presenting, by the computer system, a recommendation to a user, wherein:
the recommendation identifies the second object; and
the recommendation is at least partially based on the similarity value that identifies the amount of similarity between the first object and the second object of the enterprise.

14. The method of claim 7, further comprising storing, by the computer system, the similarity value that identifies the amount of similarity in a database that stores a plurality of similarity values for a plurality of pairs of objects of the enterprise.

15. The method of claim 7, wherein performing, by the computer system, the similarity comparison using the first vector and the second vector further comprises:
determining, by the computer system, a first number based on elements of the first vector and elements of the second vector that indicate at least one same action has been performed using the first object and the second object;
determining, by the computer system, a second number based on elements in the first vector and elements of the second vector, wherein at least one element of the first vector and the second vector indicates an action has been performed using at least one of the first object and the second object; and
calculating, by the computer system, using the first number and the second number, the similarity value that identifies the amount of similarity between the first object and the second object of the enterprise based on actions involving the first object and the second object.

16. A computer program product stored on a non-transitory computer-readable storage medium for collaborative filtering of enterprise objects, the computer program product comprising instructions for:
identifying a first object;
identifying a second object to be compared with the first object, wherein the first object and the second object are part of an enterprise;
creating a first vector linked to the first object, wherein the first vector comprises a first plurality of elements representing user actions performed involving the first object by a first set of one or more users;
creating a second vector linked to the second object, wherein the second vector comprises a second plurality of element representing user actions performed involving the second object by a second set of one or more users; and
performing a similarity comparison using the first vector and the second vector, wherein the similarity comparison calculates a similarity value that identifies an amount of similarity between the first object and the second object of the enterprise based on user actions performed involving the first object and the second object, wherein the similarity comparison is based at least in part on one or more manners of user interaction corresponding to one or more of: accessing, handling, qualifying, and/or associating with additional information.

17. The computer program product of claim 16, wherein the first object is a first user and the second object is a second user.

18. The computer program product of claim 16, wherein the first object is a first item and the second object is a second item.

19. The computer program product of claim 16, wherein the similarity comparison comprises using a Tanimoto similarity function.

20. The computer program product of claim 17, wherein:
the first vector comprises a first element of the first plurality of elements that identifies whether the first user has performed an action involving a first item; and
the second vector comprises a second element of the second plurality of elements that identifies whether the second user has performed the action involving the first item.

* * * * *